(12) United States Patent
Sallinen (10) Patent No.: US 12,215,736 B2
(45) Date of Patent: Feb. 4, 2025

(54) JOINT STRUCTURE FOR CONNECTING TWO FRAME TUBES IN SPORTING EQUIPMENT

(71) Applicant: Acon Finland Oy Ltd, Oulu (FI)

(72) Inventor: Joel Sallinen, Liminka (FI)

(73) Assignee: Acon Finland Oy Ltd, Oulu (FI)

( * ) Notice: Subject to any disclaimer, the term of this patent is extended or adjusted under 35 U.S.C. 154(b) by 161 days.

(21) Appl. No.: 18/077,416

(22) Filed: Dec. 8, 2022

(65) Prior Publication Data

US 2024/0191735 A1    Jun. 13, 2024

(51) Int. Cl.
*F16B 7/04* (2006.01)
*F16B 7/18* (2006.01)
*A63B 5/11* (2006.01)

(52) U.S. Cl.
CPC .............. *F16B 7/042* (2013.01); *F16B 7/182* (2013.01); *A63B 5/11* (2013.01)

(58) Field of Classification Search
CPC . A63B 5/11; F16B 7/042; F16B 7/105; F16B 7/182; F16B 2200/69; Y10T 403/58; Y10T 403/7077; Y10T 403/7079; Y10T 403/7083; Y10T 403/7084
USPC .................... 403/315, 377, 378, 379.2, 379.3
See application file for complete search history.

(56) References Cited

U.S. PATENT DOCUMENTS

| | | | | |
|---|---|---|---|---|
| 5,078,534 A * | 1/1992 | White | .......... | F16B 7/042 403/379.3 |
| 5,201,334 A * | 4/1993 | Tseng | .......... | F16B 7/105 403/191 |
| 5,779,386 A * | 7/1998 | Eichhorn | .......... | F16B 7/0413 403/377 |
| 6,854,916 B2 * | 2/2005 | Hsieh | .......... | F16B 7/105 403/109.1 |
| 7,182,713 B2 * | 2/2007 | Wang | .......... | G06F 3/03543 482/28 |
| 9,080,585 B2 * | 7/2015 | Lai | .......... | F16B 7/042 |
| 9,440,721 B2 * | 9/2016 | Marino | .......... | B63B 32/40 |
| 11,123,857 B1 * | 9/2021 | Ramsey | .......... | F16B 7/042 |

(Continued)

FOREIGN PATENT DOCUMENTS

| | | | | |
|---|---|---|---|---|
| DE | 2632834 A1 * | 1/1978 | .......... | F16B 7/042 |
| DE | 4210947 A1 * | 10/1993 | .......... | F16B 7/042 |

(Continued)

OTHER PUBLICATIONS

Extended European Search Report for Application 22210879.7-1122, dated May 11, 2023.

*Primary Examiner* — Josh Skroupa (74) *Attorney, Agent, or Firm* — BelayIP (57) ABSTRACT

A joint structure for connecting two hollow frame tubes in sporting equipment. The tubes have a shell, a sleeve part, and a receiving part. The sleeve part is configured to fit into the receiving part in such a way that there is a hole running through both parts. The joint structure includes a locking arrangement having an elongated spring strip that is bent into a first wing and a second wing. The holding part includes a first connecting element and a second connecting element. The first connecting element is configured to be inserted inside of the sleeve part and the second connecting element is configured to be fixed to the first connecting element in such a way that the shell of the second tube and the shell of the first tube is between the connecting elements.

15 Claims, 4 Drawing Sheets

(56) References Cited

U.S. PATENT DOCUMENTS

| | | | | |
|---|---|---|---|---|
| 2003/0007830 A1* | 1/2003 | Bang | ................ | F16B 7/042 |
| | | | | 403/327 |
| 2005/0238422 A1* | 10/2005 | Hung | ................ | F16B 7/042 |
| | | | | 403/379.4 |
| 2006/0046899 A1* | 3/2006 | Wang | ................ | F16B 7/042 |
| | | | | 482/27 |
| 2006/0102218 A1* | 5/2006 | Kwon | ................ | F16B 7/042 |
| | | | | 135/114 |
| 2011/0078953 A1 | 4/2011 | Liu | | |
| 2017/0361143 A1 | 12/2017 | Mehr et al. | | |
| 2019/0323531 A1* | 10/2019 | Wang | ................ | F16B 7/042 |

FOREIGN PATENT DOCUMENTS

| | | | | |
|---|---|---|---|---|
| DE | 29815824 U1 * | 1/2000 | ............ | F16B 7/042 |
| DE | 102008056460 A1 * | 5/2010 | ............ | E04H 15/46 |
| DE | 102013106496 B3 * | 11/2014 | ............ | F16B 7/042 |
| EP | 1099861 A2 | 5/2001 | | |
| EP | 2754901 A2 | 7/2014 | | |
| GB | 2450742 A * | 1/2009 | ............ | F16B 7/042 |
| WO | WO-03049574 A1 * | 6/2003 | ............ | F16B 7/105 |
| WO | WO2009/094826 A1 | 6/2009 | | |

* cited by examiner

JOINT STRUCTURE FOR CONNECTING TWO FRAME TUBES IN SPORTING EQUIPMENT

CROSS REFERENCE TO RELATED APPLICATIONS

This application is a national filing based upon Finnish priority patent application FI20217189, filed Dec. 3, 2021, the content of which is herein incorporated by reference.

BACKGROUND OF THE INVENTION

Field of the Invention

The invention relates to a joint structure for connecting two hollow frame tubes in sporting equipment. The frame tubes are a first tube and a second tube, and the tubes have a shell, and at the one end of the first tube is a sleeve part and the diameter of the sleeve part is less than the diameter of the first tube in the vicinity of the sleeve part, and the at the one end of the second tube is a receiving part. On the sleeve part is a sleeve part hole and on the receiving part is a receiving part hole. The sleeve part is configured to fit into the receiving part in such a way that there is a position where said holes converge. The joint structure comprises a locking arrangement, and the locking arrangement comprises an elongated spring strip that is bent into two wings: a first wing and a second wing, and the spring strip is inside the tubes. The joint structure further comprises a holding part that is configured to fit at least partly into said converging holes.

DESCRIPTION OF RELATED ART

Sporting equipment such as trampolines are commonly used in outdoor and indoor activities. They comprise frame structures, which function, for example, as support structures and, if required, as safety fences. The sporting activities subject the frames to substantial stress in this kind of equipment.

For example, trampolines, and more particularly outdoor trampolines, have a diameter of over 2 metres, generally 3 to 5 metres. The mat of said devices is located at least 60 to 100 centimetres above the ground. On devices of this type, people attempt to jump as high as possible. During landing, the frame structure of the trampoline is subjected to forces that correspond to a multiple of the user's weight. In the case of outdoor trampolines, loadings in the region of four to eight times the gravitational acceleration occur. In addition to the vertically acting forces, considerable horizontal forces or transverse forces can also act on the frame structure. It follows from the abovementioned facts that trampolines require a solid frame structure that can withstand a multitude of torsion forces.

In some trampoline frame structures, the trampoline frame parts have been welded to their legs. The mat in the centre of the circle formed by the trampoline frame parts is stretched out by the springs or similar elastic elements. The trampoline frame parts are welded to each other, and the trampoline frame parts are welded to their legs as well. However, the welds are susceptible to corrosion, and the welds may fail during use, which poses a safety hazard. Furthermore, the welded trampoline frame structure cannot be disassembled any longer, and when stored, it occupies much space. It is clear that welding is not ideal in all applications.

There are trampoline frame structures in which a rim structure around the mat is constructed from several separate transverse tubes that are connected to each other with joint structures. Also, the legs are connected in a detachable manner to the trampoline frame. The transverse tubes are connected to the joint structures with some clamping arrangements, such as bolts or screws, which penetrate both the joint structure and the end of the transverse tube to fix them together. One such trampoline frame structure is disclosed by patent publication FI20065036. However, the structure that the publication describes is still quite cumbersome to assemble.

Patent publication US20170361143 discloses a frame structure for a trampoline. It comprises transverse tubes, joint structures, and legs. The joint structure has a conical depression and threaded bolt in the middle of the depression to accept the hollow cone at the end of the leg. To fix the leg, it is screwed into the conical depression on the joint structure. However, the structure itself is quite complicated to manufacture and the threads are prone to breakage. Also, if there is dirt between the leg cone and the walls of the depression, it may lead to a situation where the leg is not properly fixed to the joint structure and the frame structure may wobble somewhat. This may lead to fractures in the frame structure.

Patent publication U.S. Pat. No. 7,182,713 discloses a quick-coupling arrangement for a trampoline safety fence. The arrangement comprises an elastic connecting element in the form of the letter V to connect two hollow tubes together. The elastic connecting element include two outwardly stretched arms that naturally and elastically press against two opposite inner surfaces of the tubes. One of the two arms is provided with a short shaft tube that elastically extends through the two aligned through-holes on two coupled hollow tubes to hold the two coupled sections in place relative to each other. However, the arrangement is such that the connected tubes may slightly move in relation to each other. This may cause unwanted noise and in the worst cases the tubes may come apart.

It must be noted that even though the examples concern trampoline frames, the problems are known to apply to other sporting equipment having a frame where tubes are interconnected.

There is a clear need for a simple and reliable frame structure connection arrangement for sporting equipment that is rigid. Also, the resulting noise should be minimised.

BRIEF SUMMARY OF THE INVENTION

An object of the invention is a solution that can significantly reduce the disadvantages and drawbacks of the prior art. In particular, the object of the invention is a solution where a joint structure is provided that connects two frame tubes.

The objects of the invention are attained with a device that is characterised by what is stated in the independent patent claim. Some advantageous embodiments of the invention are disclosed in the dependent claims.

The invention is a joint structure for interconnecting two hollow frame tubes in a sporting equipment. The tubes have a shell, a sleeve part and a receiving part, and the sleeve part is configured to fit into the receiving part in such a way that there is a hole penetrating both said parts. The joint structure comprises a locking arrangement, itself comprising an elongated spring strip that is bent into a first wing and a second wing, and a holding part comprising a first connecting element and a second connecting element. The first connecting element is configured to be inserted into the sleeve part and the second connecting element is configured to be fixed to the first connecting element in such a way that the shell of the second tube and the shell of the first tube is between said connecting elements.

When reference is made in the text to the upper or the lower parts or respective directions such as down or up, a situation is described in which the solution according to the invention is in use in a frame of sporting equipment. Also, when reference is made to the vertical or horizontal directions or surfaces, the invention is placed similarly.

In one embodiment of the invention is a joint structure for connecting two hollow frame tubes in sporting equipment, a first tube and a second tube, and the tubes have a shell. At the one end of the first tube is a sleeve part and the diameter of the sleeve part is less than the diameter of the first tube in the vicinity of the sleeve part, and at the one end of the second tube is a receiving part. On the sleeve part is a sleeve part hole and on the receiving part is a receiving part hole, and the sleeve part is configured to fit into the receiving part in such a way that there is a position where said holes converge. The joint structure comprises a locking arrangement, and the locking arrangement comprises an elongated spring strip that is bent into two wings: a first wing and a second wing, and the spring strip is inside the tubes. The joint structure further comprises a holding part that is configured to fit at least partly into said converging holes. In one advantageous embodiment of the invention, the spring strip is at least partly inside the sleeve part and is open towards the first tube when the locking arrangement is interconnecting the tubes. Near the end of the first wing is a wing hole. The holding part comprises two connecting elements: a first connecting element and a second connecting element. The first connecting element comprises a partly conelike head and a shaft, and the first connecting element is configured to be inserted into the sleeve part in such a way that the shaft is in the wing hole and the head is partly inside of the sleeve part hole, and the second connecting element is at least partly outside of the tubes. The first connecting element comprise a connecting hole, and the connecting hole is configured to run through the head and at least part of the shaft, the second connecting element is configured to be inserted into the connecting hole in such a way that the shell of the second tube and the shell of the first tube is between the second connecting element and the head of the first connecting element.

In one embodiment of the joint structure, the thickness of the shell is less in the receiving part than the thickness of the shell of the second tube in the vicinity of the receiving part. This feature keeps the diameter of the tube constant, which improves safety.

In a second embodiment of the joint structure, the first wing is longer than the second wing. This feature helps placing the spring strip into the first tube and it can be used for adjusting its spring force.

In a third embodiment of the joint structure, the connection point of the first wing and the second wing at the spring strip is configured to extend over the end of the sleeve part, i.e. the connection point extends over the end of the first tube. This feature makes it easier to assemble and disassemble the tube connection.

In a fourth embodiment of the joint structure, the border of the sleeve part is a gradient in the shell of the first tube, and the end of the second tube is shaped correspondingly. In a fifth embodiment of the joint structure, the gradient slope is situated toward the end of the sleeve part. This feature improves the stability of the tube connection.

In a sixth embodiment of the joint structure, the second connecting element is a bolt-like structure comprising a second connecting element head and a second connecting element shaft, and the second connecting element shaft is threaded and the connecting hole is correspondingly threaded. In a seventh embodiment of the joint structure, the second connecting element head is partly cone-like, and the cone surfaces of the second connecting element head and the head of the first connecting element become narrower where they approach each other when the tubes are connected. These features improve the connection of the tubes.

In an eighth embodiment of the joint structure, the second connecting element comprises two separate parts: a head part and a shaft part, and one end of the shaft part is configured to be inserted into the connecting hole and the head part is configured to be fixed to another end of the shaft part. In a ninth embodiment of the joint structure, the first connecting element is configured to act as a locking pin for the second connecting element. In a tenth embodiment of the joint structure, the head part is a nut. These features improve the connection of the tubes.

In an eleventh embodiment of the joint structure, the parts of the second connecting element that are outside of the second tube when the tubes are connected are configured to be an attaching element for attaching an auxiliarity structure to the frame that the tubes are forming.

In a twelfth embodiment of the joint structure, the first connecting element is fixed to the first wing. This feature helps the insertion of the spring strip into the first tube.

In a thirteenth embodiment of the joint structure, the area around the wing hole in the first wing is parallel to the longitudinal axes of the connected tubes. This feature makes for a better support for the first connecting element.

In a fourteenth embodiment of the joint structure, the main directions of the first wing and the second wing are different from each other and they differ from the longitudinal axes of the connected tubes. Changing the angle between the wings adjusts the spring force.

It is an advantage of the invention that it provides a joint structure that is easy to use and it is applicable to frames of different kinds of equipment. Using the joint structure significantly improves the efficiency of assembling and disassembling the frame. Also, it has no complex parts, so that it is easier to manufacture and maintain than joint structures according to known techniques.

One advantage of the invention is that it is quite efficient for providing a rigid connection between tubes.

It is a further advantage of the invention that it reduces noise produced by the adjacent frame tubes.

BRIEF DESCRIPTION OF THE SEVERAL VIEWS OF THE DRAWINGS

Further advantages features and details of the various embodiments of this disclosure will become apparent from 11 the ensuing description of a preferred exemplary embodiment and with the aid of the drawings. The features and combinations of features recited below in the description, as well as the features and feature combination shown after that in the drawing description or in the drawings alone, may be used not only in the particular combination recited, but also in other combinations on their own, with departing from the scope of the disclosure.

In the following, the invention is described in detail. The description refers to the accompanying drawings, in which.

DETAILED DESCRIPTIONS OF THE INVENTION

As used throughout the present disclosure, unless specifically stated otherwise, the term "or" encompasses all possible combinations, except where infeasible. For example, the expression "A or B" shall mean A alone, B alone, or A and B together. If it is stated that a component includes "A, B, or C" then, unless specifically stated otherwise or infeasible, the component may include A, or B, or C, or A and B, or A and C, or B and C, or A and B and C. Expressions such as "at least one of" do not necessarily modify an entirety of the following list and do not necessarily modify each member of the list, such that "at least one of "A, B, and C" should be understood as including only one of A, only one of B, only one of C, or any combination.

The embodiments in the following description are given as examples only and someone skilled in the art can carry out the basic idea of the invention also in some other way than what is described in the description. Though the description may refer to a certain embodiment or embodiments in several places, this does not mean that the reference would be directed towards only one described embodiment or that the described characteristic would be usable only in one described embodiment. The individual characteristics of two or more embodiments may be combined and new embodiments of the invention may thus be provided.

Figure 1:
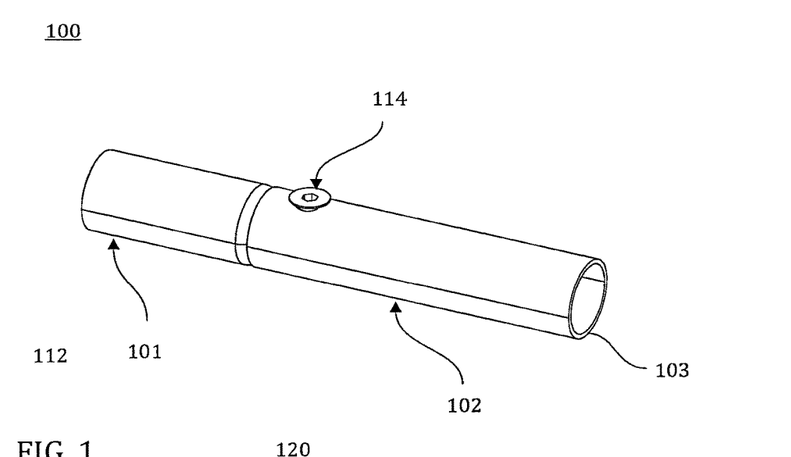
FIG. 1 depicts an example of a joint structure connecting two tubes according to an embodiment.

FIG. 1 shows an embodiment of a joint structure 100. The joint structure connects two tubes: a first tube 101 and a second tube 102. Tubes are hollow and have a shell 103. While the thickness of the shell is mainly constant, there are areas where the shell is thinner. In this embodiment, the cross section of the tubes is round. In other embodiments, other shapes can be used like, for example, ellipsoidal shapes. The tubes form a part of a frame of sporting equipment. Here, the term 'sporting equipment' denotes a device that can be used for some activity such as jumping or climbing. It is essential that the equipment comprises a frame that is at least partially formed by hollow tubes that are interconnected. At least some of the connections are implemented with the joint structure according to the invention.

The inventor has discovered that contrary to common belief, that the main source of noise from the trampoline are not the springs or the joints of the legs, but the frame and more particularly the connections between the transverse tubes and the joint sleeve structures. This applies to many kinds of sporting equipment frames. Thus, by improving the tube connections by using the joint structure 100 according to the invention, noise can be reduced significantly.

Figure 2:
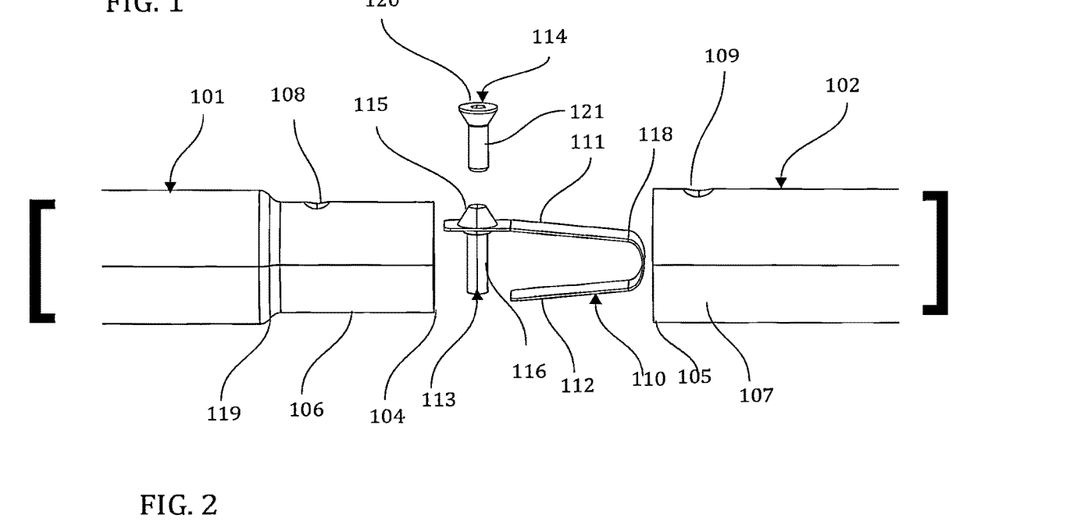
FIG. 2 depicts the joint structure presented in FIG. 1 in an exploded form.

FIG. 2 shows the joint structure 100 disclosed in FIG. 1. FIG. 2 presents the parts of the joint structure as an exploded view, i.e. the parts are at least partly disconnected from each other. This means that they may not be in the real positions when the joint structure is in use for connecting the tubes. Also, the dimensions of the parts may be changed for the purpose of clarity.

The joint structure 100 comprises a first tube 101 and a second tube 102. The first tube has an end 104 of the first tube and the second tube has an end 105 of the second tube. At the end of the first tube is a sleeve part 106. The diameter of the sleeve part is less than the diameter of the first tube in the vicinity of the sleeve part, i.e., the thickness of the shell 103 on the sleeve part is less than in the other areas of the tube. At the border of the sleeve part is a gradient 119 where the shell is sloping toward the end of the first tube. This means that the thickness of the shell decreases in the gradient area in comparison to the thickness of shell of the tube toward the thickness of shell of the sleeve part. In this embodiment, the slope of the gradient is 45 degrees. Naturally, other values can be used or there is a step. The diameter of the sleeve part is constant. On the sleeve part there is a sleeve part hole 108 that runs though the shell of the sleeve part. In this embodiment, the sleeve part hole is closer to the border of the sleeve part than to the end of the first tube.

At the end of the second tube 102 is a receiving part 107. The diameter of the inner part of the tube at the receiving part is larger than the diameter of the inner part of the second tube in the other areas. This means that the thickness of the shell at the receiving part is less than the thickness of the shell at the other areas of the second tube. On the receiving part, there is a receiving part hole 109 that runs through the shell of the receiving part. The receiving part is configured in such a way that the sleeve part 106 can be fitted into the receiving part.

The part of the second tube that receives the sleeve part is the receiving part. Advantageously, the diameter of the sleeve part is the same or slightly less than the diameter of the inner part of the receiving part. The diameter of the inner part of the receiving part is measured from one point of the inner surface of the shell to the opposing point of the inner surface of the shell. In embodiments where the gradient 119 is used in the border of the sleeve part on the first tube 101, the end 105 of the second tube and the inner surface of the shell are shaped correspondingly in order to fit the end of the second tube over the gradient at least partly.

The sleeve part hole 108 and the receiving part hole 109 are configured in such a way that there is a position where said holes converge, forming a straight hole running trough the shells of the first tube 101 and the second tube 102. Advantageously, this position is the position where the first tube 101 and the second tube 102 will be when they are connected, i.e., the sleeve part 106 is fitted into the receiving part 107.

For connecting the first tube 101 and the second tube 102 to each other, the joint structure 100 further comprises a locking part and a holding part. The locking part is configured to lock the tubes in the connection position and the holding part is configured hold the locking part and the tubes together. The locking part comprises an elongated spring strip 110 and the holding part comprises a first connecting element 113 and a second connecting element 114. The spring strip is configured to go inside of the connected tubes and more particularly, at least partly inside of the sleeve part 106 and the receiving part 107 when they are fixed to each other. The holding part is configured to be inserted into the sleeve part hole 108 and the receiving part hole 109 when they are converging.

The spring strip 110 is an elongated metal strip that is bent to a U- or V-shape having two wings: a first wing 111 and a second wing 112 and a connection point or area 118 between the wings. The metal strip has a first end and a second end of the strip and long sides and surfaces. The spring strip is bent in such a way that the first end forms the end of the first wing and the second end forms the end of the second wing. The second ends of the wings are interconnected at the connection point or both are connected to the connection area. The spring strip has a resting position where the spring strip positions itself when it not subjected to external compressing forces. The main directions of the first wing and the second wing, when the spring strip is inside of the tubes, are different from each other and they differ from the longitudinal axes of the connected tubes. If the spring strip is compressed in such a way that the first ends of the wings are approaching each other, the spring strip strives to return to a position where it was is not compressed. The extent of this returning force or spring force depends mainly on the spring material and the shape of the spring strip. The properties of the spring strip can be changed to suit the desired spring force. The desired spring force depends on the requirements set by the frame and the tube connections. The holding part is configured to press the first ends of the wings towards each other, thus increasing the spring force.

On the first wing 111 there is a wing hole that runs through the spring strip 110. The wing hole is positioned near the first end of the spring strip. In this embodiment, the first wing is longer than the second wing 112. The wing hole is in this area, which extends over the length of the second wing. In this embodiment, this area is slightly bent toward the space between the first wing and the second wing. This shape improves the positioning of the spring strip when the holding part is pressing against the first wing.

The first connecting element 113 and the second connecting element 114 are in this embodiment both bolt-like structures that form the holding part. The first connecting element comprises a head 115 and a shaft 116 of the first connecting element. The head is partly cone-like (a cone with a flattened top) and it widens toward the shaft. The shaft is configured to go through the wing hole in such a way that the lower surface of the head is at the same level as the first wing 111. In some embodiments, the first connecting element is fixed to the first wing. The first connecting element further comprises a connecting hole, and the connecting hole is configured to run through the head and at least part through the shaft. The second connecting element comprises a second connecting element head 120 and a second connecting element shaft 121. In this embodiment, the second connecting element head is shaped as an upwardly opening cone, i.e., the second connecting element head widens in an outward direction from the second connecting element shaft. The second connecting element shaft is configured to fit into the connecting hole.

The surface second connecting element shaft 121 comprises threading. The walls of the connecting hole in the first connecting element 113 comprise corresponding threading. In some embodiments, the first connecting element and the second connecting element 114 and especially the threadings are configured in such a way that when the second connecting element shaft is fitted into the connecting hole, the first connecting element and the second connecting element are pulled together and thus the holding part is holding the tubes together and at the same time positioning the spring strip 110 for locking the tubes by pressing at least the tube shell walls of the sleeve part 106 outward. The shells of the sleeve part and the receiving part 107 are located between the head 115 of the first connecting element and the second connecting element head 120. In some embodiments, the first connecting element and the second connecting element are configured in such way that when the second connecting element is inserted into the first connecting element, the second connecting element is attached to the shell and pushes against the first connecting element. When the first ends of the wings of the spring strip 110 approach each other, the spring force increases and the spring strip clamps the tubes more tightly together.

The sleeve part hole 108 and the receiving part hole 109 and their edges are shaped in such a way that the head 115 of the first connecting element and the second connecting element head 120 would fit better in said holes.

The spring strip 110 opens towards the first tube 101. This means that the first ends of the wings point toward the first tube when the joint structure 100 is used to interconnect the first tube 101 and the second tube. This helps to position the spring strip into the first tube. When the spring strip is in place for connecting the tubes, a part of the spring strip extends over the end 104 of the first tube 101. This part is at least the connection area 118. Also, this helps to position the spring strip into the first tube.

Figure 3:
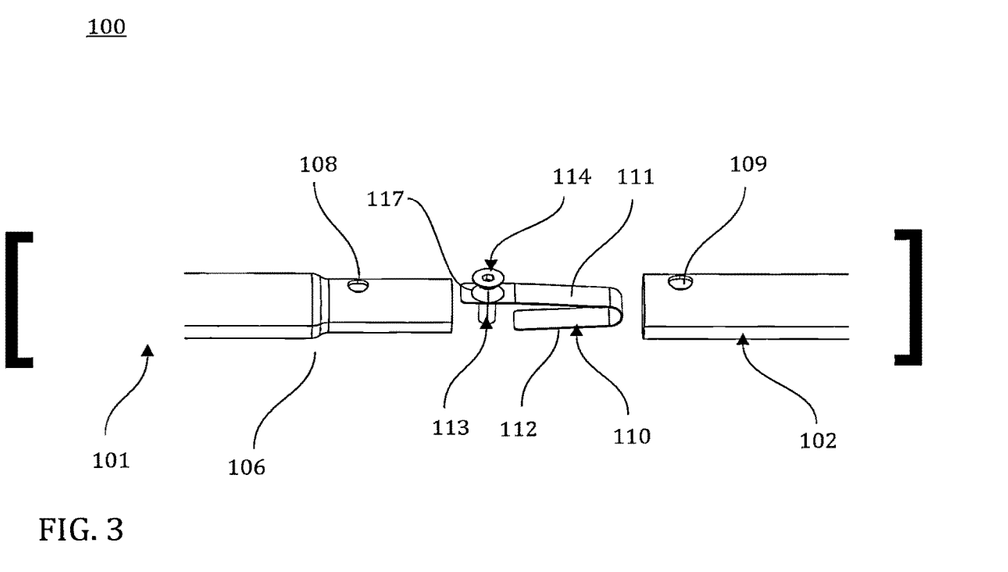
FIG. 3 depicts the joint structure presented in FIG. 1 in an exploded form.

FIG. 3 shows a second exploded view of the joint structure 100 disclosed in FIG. 1. This Figure explains how the first connecting element 113 and the second connecting element 114 are positioned when the joint structure is used to interconnect the first tube 101 and the second tube 102. The head 115 of the first connecting element is on the surface of the first wing 111 and the shaft 116 of the first connecting element goes through the wing hole 117. When the tubes are being connected, the spring strip 110 is inserted into the sleeve part 106. The first ends of the wings are pressed toward each other from the resting position. When the compressed spring strip is fitted into the first tube 101, it is pushed inside until the head 115 of the first connecting element is inside of the sleeve part hole 108. The second tube 102 is pushed over the sleeve part until the receiving part hole 109 and the sleeve part hole converge. The second connecting element 114 is attached to the first connecting element by inserting the second connecting element shaft into the connecting hole in the first connecting element.

Figure 4:
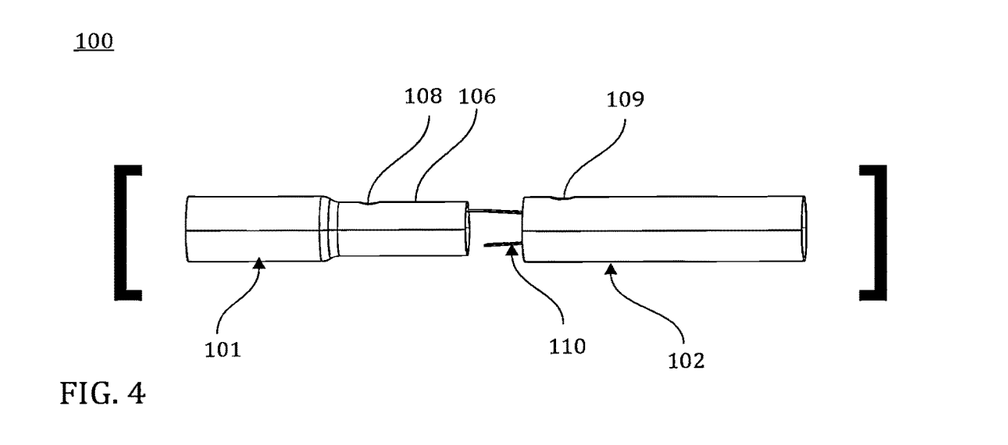
FIG. 4 depicts the joint structure presented in FIG. 1 when the tubes are separated.

FIG. 4 shows the joint structure 100 presented in FIG. 1 when the first tube 101 and the second tube 102 are being separated, and the spring strip 110 is partly inside of both of the tubes. The second connecting element shaft has been detached from the sleeve part hole 108 and the receiving part hole 109. After that, the second tube has been pulled off from the sleeve part 106.

Figure 5:
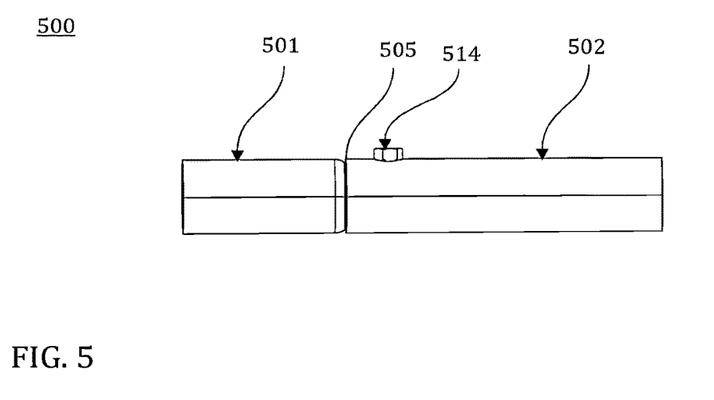
FIG. 5 depicts a second example of a joint structure connecting two tubes according to an embodiment.

FIG. 5 shows a second embodiment of a joint structure 500. The joint structure connects two hollow tubes: a first tube 501 and a second tube 502. The tubes have a shell. The first tube has an end of the first tube and the second tube has an end 505 of the second tube. The second tube is pushed over the first tube until the end of the second tube reaches a step on the shell of the first tube. The tubes are configured in such a way that when the tubes are interconnected, the diameter of the connected tube system is practically constant. The tubes are locked to each other with a locking arrangement inside of the tubes and are held together with a holding arrangement. The holding arrangement comprises a first connecting element (not shown in FIG. 5) and a second connecting element 514. The second connecting element is shaped in such a way that parts that remain outside of the second tube when the tubes are interconnected are configured to act as an attaching element for attaching an auxiliarity structure to the frame that is formed by the tubes. These auxiliarity structures may be, for example, some game accessories, such as goals or flags.

Figure 6:
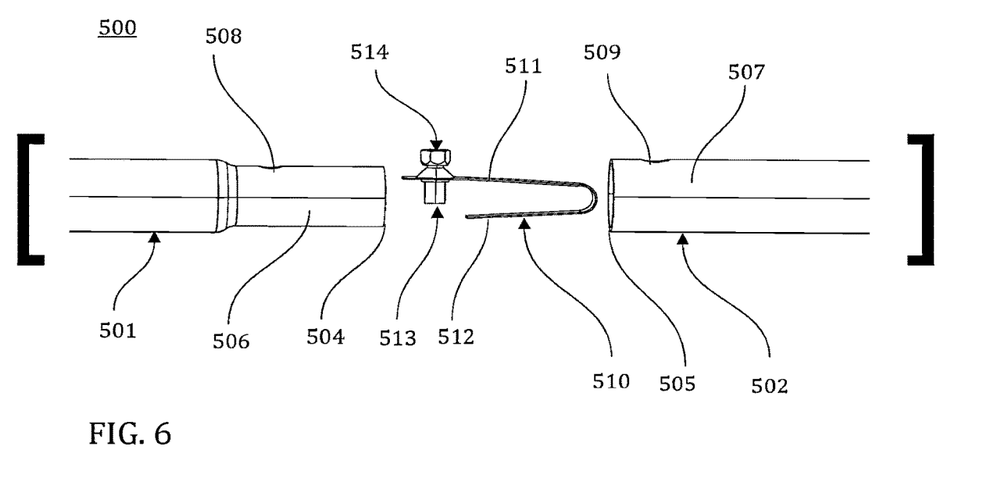
FIG. 6 depicts the joint structure presented in FIG. 5 in an exploded form.

FIG. 6 shows an example of the joint structure 500 where the first tube 501 and the second tube 502 are separated, and the locking arrangement and the holding arrangement are between tubes. It must be noted that the setup presented in this Figure is for description purposes only.

The first tube 501 has an end 504 of the first tube. The first tube comprises a sleeve part 506. The sleeve part extends from the end of the first tube toward the end of the tube. The sleeve part has a border of the sleeve part where the sleeve part ends and the regular part of the first tube begins. The shell of the tube is thinner on the sleeve part, i.e. the diameter of the tube on the sleeve part is smaller than the diameter of the tube at other places than the sleeve part. The diameter of the tube is the distance from the outer surface to the opposite side on the outer surface. On the sleeve part is a sleeve part hole 508 in the shell of the tube. The second tube 502 has the end 505 of the second tube, and the sleeve part is configured to fit inside of the second tube. The part where the sleeve part is intended to be fitted is a receiving part 507. On the shell of the receiving part, there is a receiving part hole 509. The sleeve part hole and the receiving part hole are positioned in such a way that when the second tube is placed over the first tube until the end of the second tube reaches the border of the sleeve part those said holes converge and the holding arrangement can hold them there.

The holding arrangement comprises a first connecting element 513 and a second connecting element 514. The first connecting element is practically similar to the first connecting element described with FIGS. 1 to 4. The second connecting element comprises mainly similar elements to the second connecting element described with FIGS. 1 to 4, but the elements are separated. The locking arrangement comprises a spring strip 510. The spring strip is practically similar to the spring strip described with FIGS. 1 to 4. The spring strip has a first wing 511 and a second wing 512.

Figure 7:
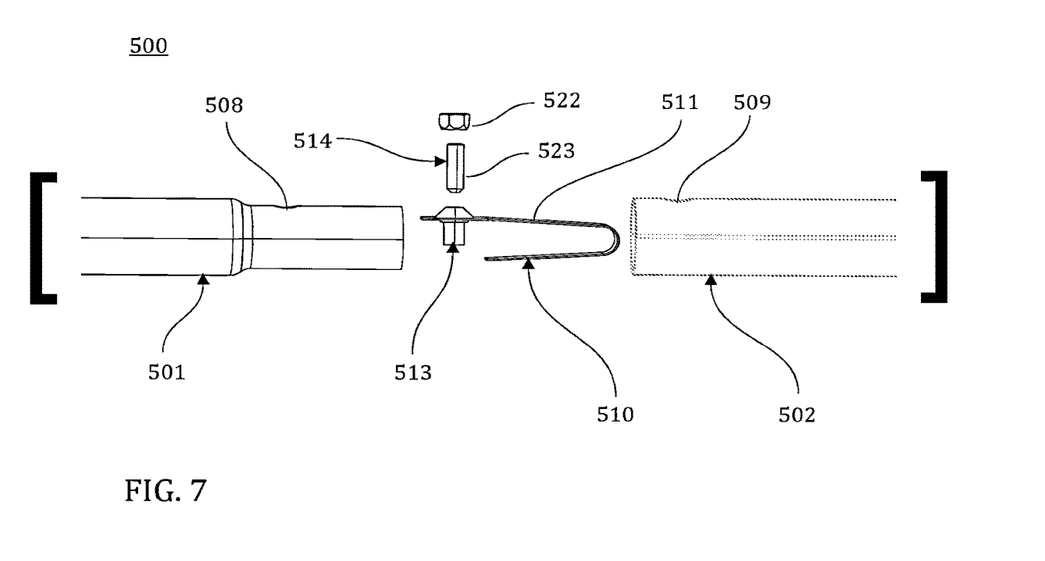
FIG. 7 depicts the joint structure presented in FIG. 5 in an exploded form.

FIG. 7 presents the joint structure 500 similarly to FIG. 6 but the second connecting element 514 is disassembled. The second connecting element comprises a head part of the second connecting element 522 and a shaft part of the second connecting element 523. The head part of second connecting element is a nut-like object. The shaft part of second connecting element is a rod with a threaded surface having a first end of the shaft part and a second end of the shaft part. The first connecting element is inserted in a similar way through the first wing 111 as was described before. Also, the first connecting element comprises a connecting hole similar to the connecting hole as described FIGS. 1 to 4. When the spring strip 510 and the first connecting element are positioned inside the sleeve part in such a way that the first connecting element is partly inside of the sleeve part hole 508, the second tube 502 can be slid over the first tube 501 into such a position that the sleeve part hole 508 and the receiving part hole 509 converge and form one hole running through the shells of the first tube and the second tube. The second end of the shaft part 523 of the second connecting element is pushed through the hole and is inserted into the connecting hole in the first connecting element. The shaft part of the second connecting element is configured in such a way that the second end of the shaft part of the second connecting element is outside of the outer surface of the second tube, i.e., the connected tubes. The head part of the second connecting element 522 is attached to the second end of the shaft part of the second connecting element. When the head part of the second connecting element is used to attach auxiliary devices to the frame, the first connecting element works as a pin that prevents outward movement of the holding arrangement.

Figure 8:
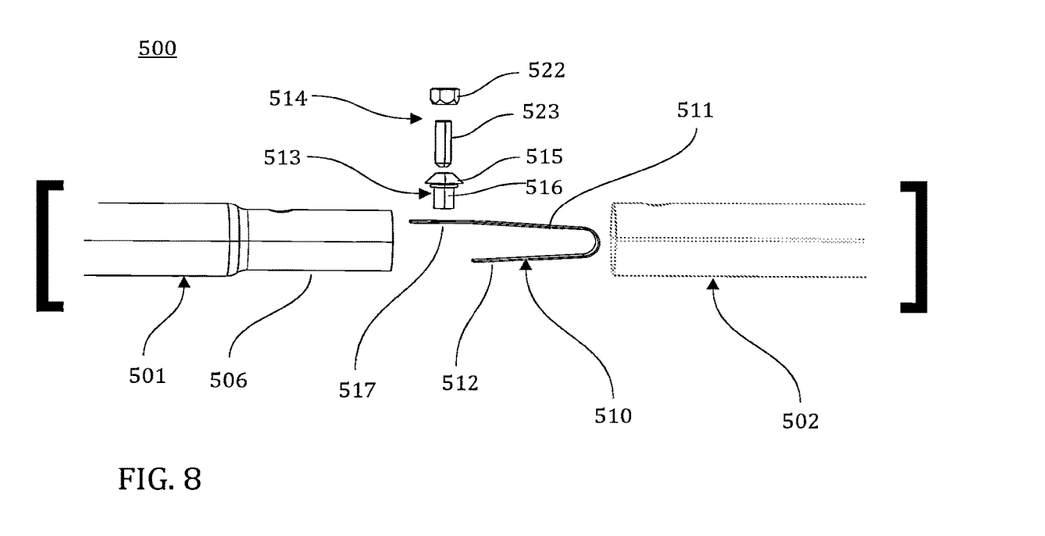
FIG. 8 depicts the joint structure presented in FIG. 5 in an exploded form.

FIG. 8 discloses a similar setup to what was presented in FIGS. 6 and 7, but now the first connecting element 513 is separated from the first wing 511 and the wing hole 517. The first connecting element comprises a head of the first connecting element 515 and a shaft of the first connecting element 516.

Some advantageous embodiments of the device according to the invention have been described above. The invention is however not limited to the embodiments described above, but the inventive idea can be applied in numerous ways within the scope of the claims.

Having described some aspects of the present disclosure in detail, it will be apparent that further modifications and variations are possible without departing from the scope of the disclosure. All matter contained in the above description and shown in the accompanying drawings shall be implemented as illustrated and not in a limiting sense.

What is claimed is:

1. A joint structure for connecting two hollow frame tubes in sporting equipment, the joint structure comprising:
   a first tube and a second tube comprising a shell, wherein:
      a sleeve part is arranged at one end and a diameter of the sleeve part is less than a diameter of the first tube in the vicinity of the sleeve part,
   a receiving part is arranged at one end of the second tube,
      a sleeve part hole is arranged on the sleeve part,
      a receiving part hole is arranged on the receiving part,
      the sleeve part is configured to fit into the receiving part so as to define a position wherein the sleeve part hole and the receiving part hole converge,
      the joint structure comprises a locking arrangement comprising an elongated spring strip that is bent into a first wing and a second wing,
      the spring strip is inside of the tubes, and
      a holding part that is configured to fit at least partly into said converging holes, and
   wherein the spring strip is arranged at least partly inside the sleeve part and is open toward the first tube when the locking arrangement is connecting the tubes,
   wherein near an end of the first wing is a wing hole, and
   wherein the holding part comprises a first connecting element and a second connecting element, wherein
      the first connecting element comprising a partly cone-like head and a shaft, and the first connecting element is configured to be inserted inside of the sleeve part such that the shaft is arranged inside of the wing hole,
      the second connecting element is arranged at least partly outside the tubes,
      the first connecting element comprises a connecting hole configured and arranged to run through the head and through at least part of the shaft, and
      the second connecting element is configured to be fixed to the connecting hole such that the shell of the second tube and the shell of the first tube is arranged between the second connecting element and the head of the first connecting element.

2. The joint structure according to claim 1, wherein a thickness of the shell is less in the receiving part than a thickness of the shell of the second tube in a vicinity of the receiving part.

3. The joint structure according to claim 1, wherein the first wing is longer than the second wing.

4. The joint structure according to claim 1, wherein the first wing comprises a connection point, and the second wing at the spring strip is configured to extend over an end of the sleeve part such that the connection point extends over the end of the first tube.

5. The joint structure according to claim 1, wherein at a border of the sleeve part comprises a gradient in the shell of the first tube, and the end of the second tube is shaped correspondingly to the gradient.

6. The joint structure according to claim 5, wherein the gradient comprises a slope arranged toward the end of the sleeve part.

7. The joint structure according to claim 1, wherein:
the second connecting element comprises a bolt-like structure comprising a second connecting element head and a second connecting element shaft, and
the second connecting element shaft is threaded and the connecting hole is threaded correspondingly.

8. The joint structure according to claim 7, wherein the second connecting element head is partly cone-like, and the cone surfaces of the second connecting element head and the head of the first connecting element become narrower where they approach each other when the tubes are interconnected.

9. The joint structure according to claim 1, wherein the second connecting element comprises a head part and a shaft part, and one end of the shaft part is configured to be fixed to the connecting hole and the head part is configured to be fixed to another end of the shaft part.

10. The joint structure according to claim 9, wherein the first connecting element is configured to act as a locking pin for the second connecting element.

11. The joint structure according to claim 9, wherein the head part is a nut.

12. The joint structure according to claim 1, wherein parts of the second connecting element outside of the second tube when the tubes are connected are configured to be an attaching element for attaching an auxiliarity structure to the frame formed by the tubes.

13. The joint structure according to claim 1, wherein the first connecting element is arranged fixed to the first wing.

14. The joint structure according to claim 1, wherein an area around the wing hole in the first wing is parallel to a longitudinal axes of the connected tubes.

15. The joint structure according to claim 1, wherein main directions of the first wing and the second wing are different from each other and from a longitudinal axes of the connected tubes.

* * * * *